(12) United States Patent
Hook et al.

(10) Patent No.: US 11,104,842 B2
(45) Date of Patent: Aug. 31, 2021

(54) PROPPANTS WITH IMPROVED DUST CONTROL

(71) Applicant: Dow Global Technologies LLC, Midland, MI (US)

(72) Inventors: Bruce D. Hook, Lake Jackson, TX (US); Paulo Fabricio Queiroz Martins, Sao Paulo (BR); Juan Carlos Medina, Lake Jackson, TX (US); Daniele Santos, Sao Jose Dos Campos (BR); Theodore Tysak, Ambler, PA (US); William A. Cynecki, Midland, MI (US); Andrea C. Keenan, Pottstown, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 151 days.

(21) Appl. No.: 16/394,052

(22) Filed: Apr. 25, 2019

(65) Prior Publication Data

US 2019/0270931 A1 Sep. 5, 2019

Related U.S. Application Data

(62) Division of application No. 15/027,612, filed as application No. PCT/US2014/064286 on Nov. 6, 2014, now Pat. No. 10,316,243.

(60) Provisional application No. 62/021,350, filed on Jul. 7, 2014, provisional application No. 61/904,619, filed on Nov. 15, 2013.

(51) Int. Cl.
C09K 8/80 (2006.01)

(52) U.S. Cl.
CPC .................................. *C09K 8/805* (2013.01)

(58) Field of Classification Search
CPC ........................... C09K 8/805; Y10S 507/901
See application file for complete search history.

(56) References Cited

U.S. PATENT DOCUMENTS

| | | | |
|---|---|---|---|
| 3,135,762 A | 6/1964 | Maeder et al. |
| 3,984,399 A | 10/1976 | Weber et al. |
| 4,150,005 A | 4/1979 | Gehman et al. |
| 4,228,042 A | 10/1980 | Letton |
| 4,239,660 A | 12/1980 | Kingry |

(Continued)

FOREIGN PATENT DOCUMENTS

| | | |
|---|---|---|
| AU | 2007231845 | 5/2009 |
| CN | 101899283 | 12/2010 |

(Continued)

OTHER PUBLICATIONS

James, et al., Molecular Weight Development in Styrene and Methyl Emulsion Polymerization, Emulsion Polymerization, Ch. 13, pp. 197-210.

(Continued)

*Primary Examiner* — Aiqun Li

(57) ABSTRACT

Provided are proppants for use in hydraulic fracturing operations. The proppants comprise particles having coatings disposed on them as described herein. The proppants exhibit reduced dust generation, for instance during transloading, conveying and/or offloading of the proppant at a wellsite and/or at intermediate shipping transload points.

8 Claims, 1 Drawing Sheet

(56) References Cited

U.S. PATENT DOCUMENTS

| | | |
|---|---|---|
| 4,260,529 A | 4/1981 | Letton |
| 4,417,992 A | 11/1983 | Bhattacharyya et al. |
| 4,517,330 A | 5/1985 | Zdanowski et al. |
| 4,551,261 A | 11/1985 | Salihar |
| 4,594,268 A | 6/1986 | Kirwin |
| 5,714,387 A | 2/1998 | Fowee et al. |
| 6,214,328 B1 | 4/2001 | Chang et al. |
| 7,270,879 B2 | 9/2007 | McCrary |
| 7,754,659 B2 | 7/2010 | Rediger et al. |
| 7,906,474 B2 | 3/2011 | Varineau et al. |
| 8,568,879 B2 | 10/2013 | Chereau et al. |
| 8,596,361 B2 | 12/2013 | Willberg et al. |
| 8,813,847 B2 | 8/2014 | Johnson, Sr. |
| 2002/0045559 A1 | 4/2002 | Forth et al. |
| 2008/0176009 A1 | 7/2008 | Chereau et al. |
| 2009/0155474 A1 | 6/2009 | Finley et al. |
| 2010/0179077 A1 | 7/2010 | Turakhia et al. |
| 2010/0203338 A1* | 8/2010 | Fan ............... C09D 201/00 428/407 |
| 2011/0098492 A1 | 4/2011 | Varineau et al. |
| 2011/0118409 A1 | 5/2011 | Eichman et al. |
| 2011/0230612 A1 | 9/2011 | Eldredge et al. |
| 2012/0227967 A1 | 9/2012 | Shaikh et al. |
| 2015/0315459 A1 | 11/2015 | McDaniel et al. |

FOREIGN PATENT DOCUMENTS

| | | |
|---|---|---|
| GB | 1081876 | 9/1967 |
| KZ | 23792 | 3/2011 |
| WO | 2006/088603 | 8/2006 |
| WO | 2007/147072 | 12/2007 |
| WO | 2008/131540 | 11/2008 |
| WO | 2013/033391 | 3/2013 |
| WO | 2013/112251 | 8/2013 |
| WO | 2013/158306 | 10/2013 |
| WO | 2013/158308 | 10/2013 |

OTHER PUBLICATIONS

Warson, Redox Polymerization in Emulsion, Emulsion Polymerization, Ch. 15, pp. 228-235.

Greene, et al., Continuous Emulsion Polymerization-Steady State and Transient Experiments with Vinyl Acetate and Methyl Methacrylate, Emulsion Polymerization, Ch. 22, pp. 341-358.

DustPRO(TM) Proppant Announcement, Aug. 26, 2014 Press Release.

PCT/US2014/064286, International Search Report and Written Opinion dated May 5, 2015.

PCT/US2014/064286, International Preliminary Report on Patentability dated Nov. 4, 2015.

* cited by examiner

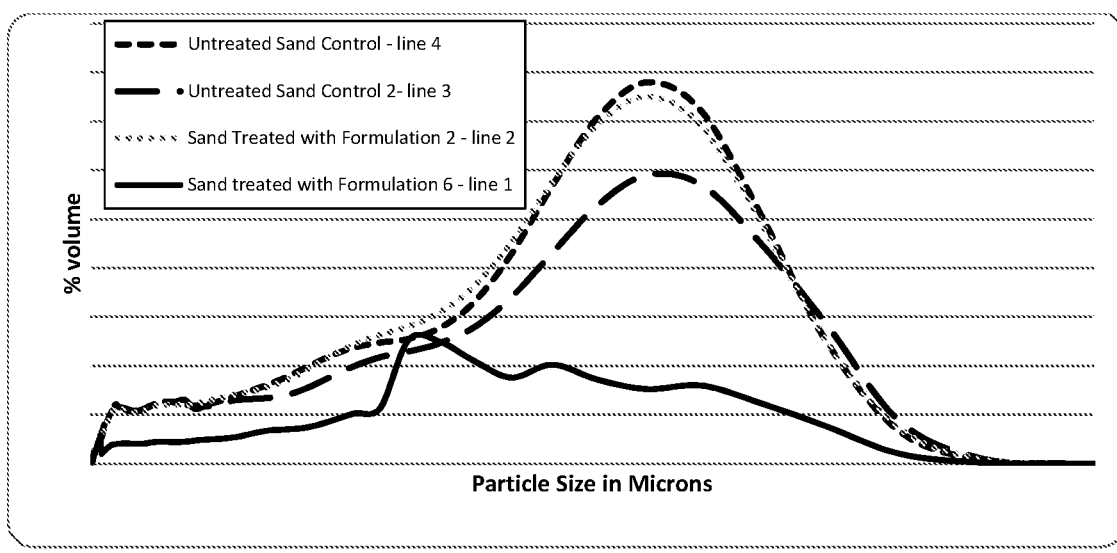

PROPPANTS WITH IMPROVED DUST CONTROL

CROSS-REFERENCE TO RELATED APPLICATIONS

This application claims priority from U.S. provisional application Ser. No. 61/904,619, filed Nov. 15, 2013, and from U.S. provisional application Ser. No. 62/021,350, filed Jul. 7, 2014, each of which is incorporated herein by reference in its entirety.

FIELD

This invention relates generally to proppants for use in hydraulic fracturing operations. More specifically, the invention relates to proppants coated with a polymer as described herein and methods of their preparation and use. The coated proppants provide improved dust control.

BACKGROUND

Hydraulic fracturing is a term that has been applied to a variety of methods used to stimulate the production of fluids (e.g., oil, natural gas, brines, etc.) from subterranean formations. In hydraulic fracturing, a fracturing fluid is injected down a wellbore and against the face of the formation at a pressure and flow rate at least sufficient to overcome the overburden pressure and to initiate and/or extend a fracture(s) into the formation. The fracturing fluid usually carries a proppant (e.g., 20-40 mesh sand, bauxite, glass beads, etc.) into a fracture which keeps the formation from closing back down upon itself when the pressure is released. The proppant-filled fractures provide permeable channels through which the formation fluids can flow to the wellbore and thereafter be withdrawn.

When preparing, transporting, and/or handling proppant for use in hydraulic fracturing, large amounts of dust, such as silica dust and other proppant dust, may be created by the movement of the proppants. This dust can produce potentially detrimental effects, such as damaging equipment on the hydraulic fracturing site.

Alternative solutions that minimize dust during handling, such as spraying the proppant with moisture, an oil or a coating, typically require high use levels of such materials, which can detrimentally cause the proppant particles to adhere to one another or behave cohesively, resulting in flowability problems.

The problem addressed by this invention is the provision of new technologies that limit the generation of dust from proppants.

STATEMENT OF INVENTION

We have now found that coating of proppant particles with a polymer binder as described herein is effective at significantly reducing the generation of dust from proppants, for instance dust formed during conveying, transloading and offloading of the proppant at a wellsite and at intermediate shipping transload points. For instance, proppants of the invention may result in 70 percent by volume or less, preferably 50 percent by volume or less, more preferably 30 percent by volume or less, even more preferably 10 percent by volume or less, of airborne dust compared to uncoated particles.

In one aspect, therefore, there is provided a proppant for use in hydraulic fracturing comprising: a particle; and a coating disposed on the particle that is formed from an aqueous coating composition, the coating composition comprising from 2 to 65 weight percent of a surfactant, and from 1 to 35 weight percent of a polymer binder, and balance water, based on the total weight of the aqueous coating composition.

BRIEF DESCRIPTION OF THE FIGURES

FIG. 1 is a graph comparing particle size versus volumes for various untreated and treated proppant particles.

DETAILED DESCRIPTION

Unless otherwise indicated, numeric ranges, for instance as in "from 2 to 10," are inclusive of the numbers defining the range (e.g., 2 and 10).

Unless otherwise indicated, ratios, percentages, parts, and the like are by weight.

Ethyleneoxy ($C_2H_4O$) refers to —$CH_2$—$CH_2$—O—, propyleneoxy ($C_3H_6O$) refers to —$CH_2$—$CH(CH_3)$—O— or —$CH(CH_3)$—$CH_2$—O—, and butyleneoxy ($C_4H_8O$) refers to —$CH_2$—$CH(CH_2CH_3)$—O— or —$CH(CH_2CH_3)$—$CH_2$—O—.

"(Meth)acrylate" as used herein means acrylate, methacrylate, or mixtures thereof, "(meth)acrylic" means acrylic, methacrylic, or mixtures thereof, and the term "(meth)acrylamide" means acrylamide, methacrylamide, or mixtures thereof.

Dust means particles as described herein that are less than 125 microns or that pass through a 120 mesh sieve.

The invention provides a proppant for use in hydraulic fracturing operations (including in manufacturing, storage, transportation, and use activities associated with hydraulic fracturing). The proppant comprises a particle and a coating disposed on the particle.

The particle may be any such material that is suitable for use in a hydraulic fracturing or similar processes. Examples of suitable particles include, without limitation, minerals, silica sand, quartz, ceramics such as synthetic ceramic particles, or combinations thereof.

A preferred particle that is commonly used as a proppant is silica sand or silicon dioxide ($SiO_2$) sand, known colloquially in the industry as "frac sand." Preferably, frac sands are those from high silica (quartz) sandstones or unconsolidated deposits. The particles may contain non-silica impurities, such as calcium, magnesium, iron, mixtures thereof, etc. The particles to be coated may be of any shape, although preferably they are roughly spherical.

The particle may generally be of any suitable grain size. In some embodiments, the particle may have a grain size ranging from 12 to 140 mesh, alternatively 20 to 70 mesh, and may include standard sizes such as 12 to 20 mesh, 16 to 30 mesh, 20 to 40 mesh, 30 to 50 mesh, and 40 to 70 mesh, whereby 90% of the product falls between the designated sieve sizes. Some specific examples are 8/12, 10/20, 20/40, and 70/140. Mesh size of particles may be determined from the percentage of particles that are retained by a series of mesh sieves having certain-sized openings. In a mesh size number, the mesh number designates the nominal number of holes in a standard unit area. Thus the small number is the larger particle size while the larger number is the small particle size in that category. The smaller the number, the coarser the grain. Grain size can also be measured using standard length measurements such as millimeters or micrometers, with some examples being grain size ranges of 2.38-1.68 mm, 2.00-0.84 mm, 0.84-0.42 mm, and 210-105 micrometers. While any particle size sample may be predominantly sized in the ranges indicated above, small portions (e.g., less than 5%) of the particle size distribution of any sample may be either larger or smaller than the ranges indicated, either due to shape irregularities or physical affinity of small particles clinging to larger particles due to electrostatics or other reasons.

According to the invention, the particle has a coating disposed on it that is formed from an aqueous coating composition as described below. The term "disposed" means that the coating covers the exterior of the particle and includes both partial and complete covering of the particle by the coating. The particle on which the coating of the invention is disposed may optionally be pre-coated (such as with a resin) or pre-treated, such as described, for instance, in U.S. Pre-Grant publication 2010/0179077 and U.S. Pat. No. 7,270,879, each of which is incorporated herein by reference. In such instances, the coating of the invention is disposed on the pre-coated or pre-treated particle.

In a some embodiments, the coating covers less than 50 percent of the particle, alternatively less than 40 percent, alternatively less than 30 percent, alternatively less than 20 percent, or alternatively less than 10 percent of the particle. Even with these incomplete coverings, the adhesive nature of the coating attracts the dust to the selected coated areas on the particle and binds them to the particle. Coverage level can be determined by various techniques, such as scanning electronic microscopy and atomic mapping.

The aqueous coating composition used for coating the particle in the invention comprises a surfactant, a polymer binder, and water.

The surfactant may be a nonionic, cationic, or anionic material, and it may be a blend of surfactants. Non-limiting examples of surfactants known in the art that may suitably be used include those described in U.S. Pre-Grant publication 2002/0045559 which is incorporated herein by reference.

Suitable anionic surfactants may include, for instance, an sulfonic acid surfactant, such as a linear alkyl benzene sulfonic acid, or salt thereof. Anionic sulfonate or sulfonic acid surfactants suitable for use herein include the acid and salt forms of $C_5$-$C_{20}$, more preferably a $C_{10}$-$C_{16}$, more preferably a $C_{11}$-$C_{13}$ alkylbenzene sulfonates, alkyl ester sulfonates, $C_6$-$C_{22}$ primary or secondary alkane sulfonates, sulfonated polycarboxylic acids, and any mixtures thereof, but preferably $C_{11}$-$C_{13}$ alkylbenzene sulfonates. Anionic sulfate salts or acids surfactants include the primary and secondary alkyl sulfates, having a linear or branched alkyl or alkenyl moiety having from 9 to 22 carbon atoms or more preferably $C_{12}$ to Cis alkyl.

Anionic surfactants that may be used also include beta-branched alkyl sulfate surfactants or mixtures of commercially available materials, having a weight average (of the surfactant or the mixture) branching degree of at least 50% or even at least 60% or even at least 80% or even at least 95%. Mid-chain branched alkyl sulfates or sulfonates are also suitable anionic surfactants for use in the invention. Preferred are the mid-chain branched alkyl sulfates.

Suitable mono-methyl branched primary alkyl sulfates that may be used in the invention include those selected from the group consisting of: 3-methyl pentadecanol sulfate, 4-methyl pentadecanol sulfate, 5-methyl pentadecanol sulfate, 6-methyl pentadecanol sulfate, 7-methyl pentadecanol sulfate, 8-methyl pentadecanol sulfate, 9-methyl pentadecanol sulfate, 10-methyl pentadecanol sulfate, 11-methyl pentadecanol sulfate, 12-methyl pentadecanol sulfate, 13-methyl pentadecanol sulfate, 3-methyl hexadecanol sulfate, 4-methyl hexadecanol sulfate, 5-methyl hexadecanol sulfate, 6-methyl hexadecanol sulfate, 7-methyl hexadecanol sulfate, 8-methyl hexadecanol sulfate, 9-methyl hexadecanol sulfate, 10-methyl hexadecanol sulfate, 11-methyl hexadecanol sulfate, 12-methyl hexadecanol sulfate, 13-methyl hexadecanol sulfate, 14-methyl hexadecanol sulfate, and mixtures thereof.

Suitable di-methyl branched primary alkyl sulfates may include materials selected from the group consisting of: 2,3-methyl tetradecanol sulfate, 2,4-methyl tetradecanol sulfate, 2,5-methyl tetradecanol sulfate, 2,6-methyl tetradecanol sulfate, 2,7-methyl tetradecanol sulfate, 2,8-methyl tetradecanol sulfate, 2,9-methyl tetradecanol sulfate, 2,10-methyl tetradecanol sulfate, 2,1-methyl tetradecanol sulfate, 2,12-methyl tetradecanol sulfate, 2,3-methyl pentadecanol sulfate, 2,4-methyl pentadecanol sulfate, 2,5-methyl pentadecanol sulfate, 2,6-methyl pentadecanol sulfate, 2,7-methyl pentadecanol sulfate, 2,8-methyl pentadecanol sulfate, 2,9-methyl pentadecanol sulfate, 2,10-methyl pentadecanol sulfate, 2,11-methyl pentadecanol sulfate, 2,12-methyl pentadecanol sulfate, 2,13-methyl pentadecanol sulfate, and mixtures thereof.

Examples of cationic surfactants that may be used in the invention include cationic mono-alkoxylated and bis-alkoxylated quaternary amine surfactants with a C6-C18 N-alkyl chain, such as of the general formula:

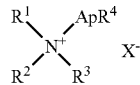

wherein R1 is an alkyl or alkenyl moiety containing from about 6 to about 18 carbon atoms, preferably 6 to about 16 carbon atoms, most preferably from about 6 to about 14 carbon atoms; R2 and R3 are each independently alkyl groups containing from one to about three carbon atoms, preferably methyl, most preferably both R2 and R3 are methyl groups; R4 is selected from hydrogen (preferred), methyl and ethyl; X is an anion such as chloride, bromide, methylsulfate, sulfate, or the like, to provide electrical neutrality; A is a alkoxy group, especially a ethyleneoxy, propyleneoxy or butyleneoxy group; and p is from 0 to about 30, preferably 2 to about 15, most preferably 2 to about 8.

The cationic bis-alkoxylated amine surfactant preferably has the general formula:

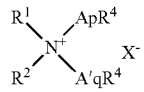

wherein R1 is an alkyl or alkenyl moiety containing from about 8 to about 18 carbon atoms, preferably 10 to about 16 carbon atoms, most preferably from about 10 to about 14 carbon atoms; R2 is an alkyl group containing from one to three carbon atoms, preferably methyl; R3 and R4 can vary independently and are selected from hydrogen (preferred), methyl and ethyl, X— is an anion such as chloride, bromide, methylsulfate, sulfate, or the like, sufficient to provide electrical neutrality. A and A' can vary independently and are each selected from C1-C4 alkoxy, especially ethyleneoxy, propyleneoxy, butyleneoxy and mixtures thereof; p is from 1 to about 30, preferably 1 to about 4 and q is from 1 to about 30, preferably 1 to about 4, and most preferably both p and q are 1.

Another suitable group of cationic surfactants which can be used in the invention are cationic ester surfactants. Suitable cationic ester surfactants, including choline ester surfactants, have for example been disclosed in U.S. Pat. Nos. 4,228,042, 4,239,660 and 4,260,529.

In the invention, nonionic surfactants are preferred (including blends thereof). Suitable nonionic surfactants include, for instance, alkoxylate materials including those that are derived from ethylene oxide, propylene oxide, and/or butylene oxide. Examples are described, for instance, in U.S. Pat. No. 7,906,474 and U.S. Pre-Grant publication 2011/0098492, each of which is incorporated herein by reference.

In some embodiments, the surfactant for use in the invention is a nonionic alkoxylate of the formula I:

$$R_a O\text{-}(AO)_z\text{—}H \qquad (I)$$

wherein $R_a$ is aryl (e.g., phenyl), or linear or branched $C_6$-$C_{24}$ alkyl, AO at each occurrence is independently ethyleneoxy, propyleneoxy, butyleneoxy, or random or block mixtures thereof, and z is from 1 to 50.

In some embodiments, a preferred nonionic surfactant for use in the aqueous coating composition is an alkoxylate represented by the following formula II:

$$R\text{—}O\text{—}(C_3H_6O)_x(C_2H_4O)_y\text{—}H \qquad (II)$$

wherein x is a real number within a range of from 0.5 to 10; y is a real number within a range of from 2 to 20, and R represents a mixture of two or more linear alkyl moieties each containing one or more linear alkyl group with an even number of carbon atoms from 4 to 20. One of the advantages of surfactants of formula I, particularly those that are natural source derived, as described below, is their general biodegradability and low toxicity.

Formula II surfactants are preferably prepared in a sequential manner that includes propoxylation (adding PO or poly(oxypropylene)) moieties to an alcohol or mixture of alcohols to form a PO block followed by ethoxylation (adding EO or poly(oxyethylene)) moieties to form an EO block attached to the PO block, but spaced apart from R which represents alkyl moieties from the alcohol or mixture of alcohols. One may either begin with a mixture of alcohols that provides a distribution of alkyl moieties and then sequentially propoxylate and ethoxylate the mixture or separately propoxylate and ethoxylate select alcohols and then combine such alkoxylates (propoxylated and ethoxylated alcohols) in proportions sufficient to provide a distribution, for example, as shown in Table A below.

Preferably, R represents a mixture of linear alkyl moieties that are the alkyl portions of seed oil-derived alcohols. In some embodiments, R has an alkyl moiety distribution as in Table A:

TABLE A

| Amount | Alkyl Moieties |
|---|---|
| 0 wt % to 40 wt % | $C_6$ |
| 20 wt %-40 wt % | $C_8$ |
| 20 wt %-45 wt % | $C_{10}$ |
| 10 wt %-45 wt % | $C_{12}$ |
| 0 wt % to 40 wt % | $C_{14}$ |
| 0 wt % to 15 wt % | $C_{16-18}$ |

As used herein, "$C_{16-18}$" means $C_{16}$, $C_{18}$, or a mixture thereof.

Any one or more of $C_6$, $C_{14}$, and $C_{16}$-18 alkyl moieties may, but need not be, present in the present invention. When present, the amounts of $C_6$, $C_{14}$, and $C_{16-18}$ alkyl moieties may satisfy any of their respective ranges as shown in Table A as long as all weight percentages total 100 wt %. In some embodiments, one or more of $C_6$, $C_{14}$, and $C_{16-18}$ alkyl moieties are present in an amount greater than zero. In some embodiments, $C_6$ and $C_{14}$ are each present in an amount greater than zero, and there is also an amount greater than zero of $C_{16-18}$.

In some embodiments, R has an alkyl moiety distribution as in Table B.

TABLE B

| Amount | Alkyl Moieties |
|---|---|
| 0 wt % to 36 wt % | $C_6$ |
| 22 wt %-40 wt % | $C_8$ |
| 27 wt %-44 wt % | $C_{10}$ |
| 14 wt %-35 wt % | $C_{12}$ |
| 5 wt % to 13 wt % | $C_{14}$ |
| 0 wt % to 5 wt % | $C_{16-18}$ |

The surfactant mixture as in Table B includes a mixture of at least four alkyl moieties: $C_8$, $C_{10}$, $C_{12}$, and $C_{14}$. Any one or more of $C_6$ and $C_{16-18}$ alkyl moieties may, but need not be, present in surfactant compositions of this preferred subset of the preferred surfactants. When present, the amounts of $C_6$, and $C_{16-18}$ alkyl moieties may satisfy any of their respective ranges as shown in Table A as long as all weight percentages total 100 wt %.

In some embodiments, the amount of $C_6$ in R is zero. Independently, in some embodiments, the amount of $C_{16-18}$ in R is not zero.

Formula II above includes variables "x" and "y" that, taken together, establish a degree of alkoxylation in an oligomer distribution. Individually, "x" and "y" represent average degrees of, respectively, propoxylation and ethoxylation. In some embodiments, the degree of propoxylation or "x" falls within a range of from 0.5 to 7, preferably within a range of 0.5 to less than 4, more preferably within a range of from 0.5 to 3, still more preferably within a range of from 2 to 3, and even more preferably within a range of from 2.5 to 3. The degree of ethoxylation or "y" preferably falls within a range of from 2 to 10, more preferably within a range of from 2 to 8, still more preferably within a range of from 4 to 8 and even more preferably within a range of from 6 to 8.

In some embodiments, the sum of x and y is 1 to 15. In some embodiments, the sum of x and y is 1 to 7. Independently, in some embodiments, y is greater than x. In some embodiments, y is greater than or equal to 2 times x. In some embodiments, x is within a range of from 2.5 to 3, y is within a range of from 2 to 10, and R has an alkyl moiety distribution as in Table B. In some embodiments, the amount of $C_6$ in R is zero, the amount of $C_{16-18}$ in R is not zero, and the sum of x and y is 1 to 7.

In some embodiments, the formula II surfactant is $C_{8-16}O(PO)_{2.5}(EO)_5H$ (based on raw material feeds) derived from an alcohol stream that provides an alkyl moiety weight percentage distribution as follows: $C_8$=22.5%, $C_{10}$=27.5%, $C_{12}$=35%, $C_{14}$=12.5 and $C_{16}$=2.5%.

In some embodiments, the formula II surfactant is a blend of $C_{8-10}O(PO)_{2.5}(EO)_{5.8}H$ (derived from an alcohol blend consisting of about 55% n-decanol and about 45% n-octanol) and $C_{12-16}O(PO)_{2.5}(EO)_8H$ (derived from an alcohol blend consisting of about 70% n-dodecanol, 25% n-tetradecanol and 5% n-hexadecanol), preferably at a ratio of the two formula II materials of 65:35.

In some embodiments, the surfactant for use in the aqueous coating composition of the invention is an alkoxylate of the formula III:

$$R^1O-(CH_2CH(R^2)-O)_p-(CH_2CH_2O)_q-H \quad (III)$$

wherein $R^1$ is linear or branched $C_4$-$C_{18}$ alkyl; $R^2$ is $CH_3$ or $CH_3CH_2$; p is a real number from 0 to 11; and q is a real number from 1 to 20. In some embodiments, $R^1$ in formula III is linear or branched $C_6$-$C_{16}$ alkyl, alternatively linear or branched $C_8$-$C_{14}$ alkyl, alternatively linear or branched $C_6$-$C_{12}$ alkyl, alternatively linear or branched $C_6$-$C_{10}$ alkyl, alternatively linear or branched $C_8$-$C_{10}$ alkyl. In some embodiments, $R^1$ is linear or branched C8 alkyl. In some embodiments, $R^1$ is 2-ethylhexyl ($CH_3CH_2CH_2CH_2CH(CH_2CH_3)CH_2-$). In some embodiments, $R^1$ is 2-propylheptyl ($CH_3CH_2CH_2CH_2CH_2CH(CH_2CH_2CH_3)CH_2-$). In some embodiments, $R^2$ in formula III is $CH_3$. In some embodiments, $R^2$ is $CH_3CH_2$. In some embodiments, p in formula III is from 3 to 10, alternatively from 4 to 6. In some embodiments, q in formula III is from 1 to 11, alternatively from 3 to 11.

In some embodiments, the formula III surfactant is $C_8$-$C_{14}O-(PO)_{2-5}(EO)_{5-9}$—H, where the C8-C14 group is linear or branched, preferably branched. In some embodiments, the formula III surfactant is $2EH(PO)_2(EO)_4$—H, $2EH(PO)_3(EO)_{6.8}$—H, $2EH(PO)_{5.5}(EO)_8$—H, $2EH(PO)_9(EO)_9$—H, $2EH(PO)_{11}(EO)_{11}$—H, $2EH(PO)_5(EO)_3$—H, or $2EH(PO)_5(EO)_6$—H (2EH=2-ethylhexyl).

In some embodiments, the surfactant for use in the aqueous coating composition is an alkoxylate of the formula IV:

$$R_a-O-(C_2H_4O)_m(C_4H_8O)_n-H \quad (IV)$$

wherein $R_a$ is one or more independently straight chain or branched alkyl groups or alkenyl groups having 3-22 carbon atoms, m is from 1 to 12, and n is from 1 to 8. In some embodiments, m may be from 2 to 12, or from 2 to 10, or even from 5-12. In some embodiments, n may be from 2 to 8, or even from 3-8, or even from 5 to 8.

In some embodiments, the surfactant for use in the aqueous coating composition is an alkoxylate of the formula V:

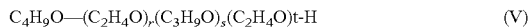

$$C_4H_9O-(C_2H_4O)_r(C_3H_9O)_s(C_2H_4O)t\text{-}H \quad (V)$$

wherein r is from 3-10, s is from 3 to 40, and t is from 10 to 45.

In some embodiments, the surfactant is an alkoxylate of the formula VI:

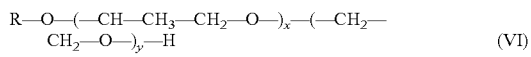

$$R-O-(-CH-CH_3-CH_2-O-)_x-(-CH_2-CH_2-O-)_y-H \quad (VI)$$

wherein x is from 0.5 to 10, y is from 2 to 20, and R is a mixture of two or more linear alkyl moieties having an even number of carbon atoms between 4 and 20.

In some embodiments, the surfactant for use in the aqueous coating composition is an alkyl polyglucoside of the formula:

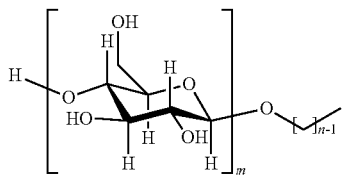

wherein m is from 1 to 10 and n is from 3 to 20.

In some embodiments, the surfactant is present in the aqueous coating composition of the invention at a concentration of from 2 to 65 weight percent, preferably from 5 to 50 weight percent, based on the total weight of the aqueous composition.

The aqueous coating composition used in the invention may optionally comprises a flocculant. Suitable flocculants include, without limitation, a water soluble poly(ethylene oxide) resin or an acrylamide resin (e.g., Hydrolyzed Poly-Acrylamide, "HPAM") or other flocculating agent.

Poly(ethylene oxide) ("PEO") resins, optionally used in the invention, comprise polymerized units derived from ethylene oxide. They may also comprise units derived from other monomers such as propylene oxide, in addition to ethylene oxide. The poly(ethylene oxide) resins are generally soluble in water and provide essentially clear, homogeneous compositions when dispersed in water.

In some embodiments, water soluble poly(ethylene oxide) resins suitable for use in the invention have the general formula $HO-[-CH_2CH_2O-]_n-H$, wherein n is from 1,000 to 200,000, for example, 1,000-100,000, or even 1,000 to 50,000. The poly(ethylene oxide) resins may have a solubility in water of from 0.01% to 100%, preferably 0.02% to 5%, at 20° C. and atmospheric pressure. Furthermore, in some embodiments, suitable water soluble poly(ethylene oxide) resins have a weight average molecular weight, $MW_w$, of 50,000 to 8,000,0000 grams per mole (g/mol), such as 75,000 to 4,000,000 g/mol, or even 100,000 to 1,000,000 g/mol. Optional flocculants, such as poly(ethylene oxide) resins, may be readily prepared using known methods. In addition, they are also commercially available.

In some embodiments, the flocculant, if used, is present in the aqueous coating composition of the invention at a concentration of from 0.01 to 5 weight percent, preferably from 0.02 to 2, based on the total weight of the aqueous composition.

Aqueous coating compositions in accordance with the invention also comprise a film-forming or binder polymer (including blends thereof), generally in the form of an aqueous dispersion or emulsion. Polymer binders suitable for use in the invention typically have glass transition temperatures, $T_g$, from −40 to 120° C., such as from −20° C. to 90° C., or from −15° C. to 80° C., or even from −10° C. to 75° C. The "glass transition temperature," or "$T_g$," as used herein, means the temperature at or above which a glassy polymer will undergo segmental motion of the polymer chain. Glass transition temperatures of a polymer can be estimated by the Fox Equation (Bulletin of American Physics Society, 1 (3), p 123, 1956), as follows:

$$1/T_g = w_1/T_{g,1} + w_2/T_{g,2}$$

For a copolymer comprising two type of monomers, $w_1$ and $w_2$ refer to the weight fraction of the two monomers, and $T_{g,1}$ and $T_{g,2}$ refer to the glass transition temperatures of the two corresponding homopolymers made from the monomers. For polymers containing three or more monomers, additional terms are added ($w_n/T_{g,n}$). The $T_g$ of a polymer can also be measured by various techniques including, for example, differential scanning calorimetry (DSC).

Polymer binders suitable for use in the aqueous coating compositions are preferably water insoluble emulsion polymers derived from one or more ethylenically unsaturated monomers, typically in the form of an aqueous dispersion. Suitable ethylenically unsaturated monomers include ethylenically unsaturated carboxylic acids, such as (meth)acrylic acid, derivatives thereof, such as ($C_1$-$C_{20}$)alkyl (meth)acrylate esters and (meth)acrylamide, vinyl aromatic monomers, vinyl alkyl monomers, alpha olefins, and combinations thereof. Further examples of suitable monomers include, without limitation, methyl acrylate, ethyl acrylate, propyl acrylate, isopropyl acrylate, butyl acrylate, isobutyl acrylate, secondary butyl acrylate, tertiary-butyl acrylate, methyl methacrylate, ethyl methacrylate, propyl methacrylate, isopropyl methacrylate, cyclopropyl, methacrylate, butyl methacrylate and isobutyl methacrylate, hexyl and cyclohexyl methacrylate, cyclohexyl acrylate, isobornyl methacrylate, 2-ethylhexyl acrylate (EHA), 2-ethylhexyl methacrylate, octyl (meth)acrylate, decyl (meth)acrylate, isodecyl (meth) acrylate, undecyl (meth)acrylate, dodecyl (meth)acrylate (also known as lauryl (meth)acrylate), tridecyl (meth)acrylate, tetradecyl (meth)acrylate (also known as myristyl (meth)acrylate), pentadecyl (meth)acrylate, hexadecyl (meth)acrylate (also known as cetyl (meth)acrylate), heptadecyl (meth)acrylate, octadecyl (meth)acrylate (also known as stearyl (meth)acrylate), nonadecyl (meth)acrylate, eicosyl (meth)acrylate, hydroxyethyl methacrylate, styrene, alpha-methyl styrene and substituted styrenes, such as vinyl toluene, 2-bromostyrene, 4-chlorostyrene, 2-methoxystyrene, 4-methoxystyrene, alpha-cyanostyrene, allyl phenyl ether and allyl tolyl ether, ethylene, propylene, butene, hexene, octane, decene, vinyl acetate (optionally copolymerized with an acrylate, such as butyl acrylate, or with ethylene), and combinations thereof. Preferred monomers include methyl acrylate, ethyl acrylate, butyl acrylate and 2-ethylhexyl acrylate, optionally in combination with a vinyl aromatic monomer, preferably styrene. More preferred is butyl acrylate optionally in combination with a vinyl aromatic monomer, preferably styrene.

Further examples include, without limitation, ethylenically unsaturated ($C_3$-$C_9$) carboxylic acid monomers, such as unsaturated monocarboxylic and dicarboxylic acid monomers. For example, unsaturated monocarboxylic acids include acrylic acid (AA), methacrylic acid (MAA), alpha-ethacrylic acid, beta-dimethylacrylic acid, vinylacetic acid, allylacetic acid, ethylidineacetic acid, propylidineacetic acid, crotonic acid, acryloxypropionic acid and alkali and metal salts thereof. Suitable unsaturated dicarboxylic acid monomers include, for example, maleic acid, maleic anhydride, fumaric acid, itaconic acid, citraconic acid, mesaconic acid, or methylenemalonic acid. Methacrylic acid (MAA) is a preferred ethylenically unsaturated carboxylic acid.

Other unsaturated monomers that, when used, are preferably copolymerized with one or more of the foregoing alkyl (meth)acrylates include, without limitation, butadiene, acrylonitrile, methacrylonitrile, crotononitrile, alpha-chloroacrylonitrile, ethyl vinyl ether, isopropyl vinyl ether, isobutyl vinyl ether, butyl vinyl ether, diethylene glycol vinyl ether, decyl vinyl ether, ethylene, methyl vinyl thioether and propyl vinyl thioether, esters of vinyl alcohol, and combinations thereof.

In some embodiments, the polymer binder is an aqueous dispersion of polymer units derived from, based on the weight of the polymer: i) from 90 to 99.9 weight percent of at least one ethylenically unsaturated monomer not including component ii; and ii) from 0.1 to 10 weight percent of (meth)acrylamide. In some embodiments, the monomer of i) comprises a ($C_1$-$C_{20}$)alkyl (meth)acrylate ester in combination with a vinyl aromatic monomer. In some embodiments, i) is butyl acrylate in combination with styrene. Preferably, the amount of butyl acrylate in such combination may be from 5 to 90 weight percent and the amount of styrene may be from 95 to 10 weight percent based on the total weight of the butyl acrylate and styrene.

In some embodiments of the invention, the polymer binder is an aqueous dispersion of polymer units derived from: butyl acrylate, styrene, and acrylamide. Preferably, the amounts, based on the weight of the polymer are: from 65 to 75 weight percent of butyl acrylate; from 23 to 33 weight percent of styrene; and from 0.5 to 6 weight percent of acrylamide. More preferably, the amounts, based on the weight of the polymer are: from 69 to 71 weight percent of butyl acrylate; from 27 to 29 weight percent of styrene; and from 1 to 3 weight percent of acrylamide.

In some embodiments of the invention, the polymer binder is an aqueous dispersion of polymer units derived from: butyl acrylate, styrene, hydroxyethyl methacrylate, and acrylamide. Preferably, the amounts, based on the weight of the polymer are: from 65 to 75 weight percent of butyl acrylate; from 24 to 32 weight percent of styrene; from 0.25 to 2 weight percent hydroxyethyl methacrylate; and from 0.5 to 6 weight percent of acrylamide. More preferably, the amounts, based on the weight of the polymer are: from 69 to 71 weight percent of butyl acrylate; from 26 to 28 weight percent of styrene; from 0.25 to 0.75 weight percent hydroxyethyl methacrylate; and from 1 to 3 weight percent of acrylamide.

In some embodiments, the polymer binder is an aqueous dispersion of polymer units derived from, based on the weight of the polymer: i) from 80 to 99.9 weight percent of at least one ethylenically unsaturated monomer not including component ii); and ii) from 0.1 to 20 weight percent of a carboxylic acid monomer. Suitable carboxylic acid monomers include those described above. Methacrylic acid (MAA) is preferred.

In some embodiments, the polymer binder used in the composition of the invention is a metal-crosslinked emulsion copolymer, such as those described in U.S. Pat. Nos. 4,150,005, 4,517,330, and U.S. Pre-Grant publications 2011/0118409, and 2011/0230612, each of which is incorporated herein by reference. Suitable metal crosslinked film-forming emulsion (co)polymers comprise polymer units derived from one or more ethylenically unsaturated monomers and one or more acid functionalized monomers reacted with a polyvalent metal compound at a temperature above or below the $T_g$ of the acid functionalized polymer to produce a crosslinked polymer.

In some embodiments, the metal-crosslinked copolymer is derived from, based on the weight of the copolymer: i) from 75 to 99 weight percent of at least one ethylenically unsaturated monomer not including component ii; and ii) from 1 to 25 weight percent of an ethylenically unsaturated carboxylic acid monomer stabilized with a polyvalent metal. In some embodiments, the monomer of i) comprises one or more ($C_1$-$C_{20}$)alkyl (meth)acrylate esters. In some embodiments, the monomer of i) comprises one or more ($C_1$-$C_{20}$) alkyl (meth)acrylate esters optionally in combination with a vinyl aromatic monomer. In some embodiments, i) is butyl acrylate, methylmethacrylate, and styrene. Preferably, the amount of butyl acrylate in such combination is from 1 to 80, the amount of methylmethacrylate is from 5 to 70, and the amount of styrene is from 0 to 70 weight percent based on the total weight of the butyl acrylate, methylmethacrylate and styrene.

Suitable carboxylic acid monomers for the foregoing embodiment include, without limitation, those described above. Methacrylic acid (MAA) is preferred.

The polyvalent metal crosslinker employed in the foregoing embodiments is generally in the form of a polyvalent metal complex containing the polyvalent metal moiety, an organic ligand moiety and, if the crosslinker is added as a chelate to the formulation in solubilized form, an alkaline moiety. The polyvalent metal ion may be that of beryllium, cadmium, copper, calcium, magnesium, zinc, zirconium, barium, aluminum, bismuth, antimony, lead, cobalt, iron, nickel or any other polyvalent metal which can be added to the composition by means of an oxide, hydroxide, or basic, acidic or neutral salt which has an appreciable solubility in water, such as at least about 1% by weight therein. The alkaline moiety may be provided by ammonia or an amine. The organic ligand may be ammonia or an amine or an organic bidentate amino acid. The amino acid bidentate ligand is preferably an aliphatic amino acid, but may also be a heterocyclic amino acid. Preferred polyvalent metal complexes include the diammonium zinc (II) and tetra-ammonium zinc (II) ions, cadmium glycinate, nickel glycinate, zinc glycinate, zirconium glycinate, zinc alanate, copper beta-alanate, zinc beta-alanate, zinc valanate, copper bisdimethylamino acetate.

The amount of polyvalent metal compound added is preferably from about 15% to 100% of the equivalent of the acid residues of the copolymer emulsion, and may be at least about 15%. More preferably the amount of the polyvalent metal ionic crosslinking agent is from about 35% to 80% of the equivalent of the acid residues of the copolymer emulsion. Still more preferably the amount of the polyvalent metal crosslinking agent is from about 40% to 70% of the equivalent of the acid residues.

In some embodiments of the invention, the metal-crosslinked copolymer is derived from butyl acrylate, methyl methacrylate, styrene, hydroxy ethyl methacrylate, acrylic acid, and methacrylic acid, crosslinked with zinc ion. Preferably, the amounts, based on the weight of the copolymer, are: from 28 to 40 weight percent butyl acrylate, from 5 to 20 weight percent methyl methacrylate, from 35 to 45 weight percent styrene, from 1 to 10 weight percent hydroxy ethyl methacrylate, from 1 to 10 weight percent acrylic acid and from 1 to 10 weight percent methacrylic acid, crosslinked with zinc ion. More preferably, the amounts, based on the weight of the copolymer, are: from 29 to 31 weight percent butyl acrylate, from 15 to 17 weight percent methyl methacrylate, from 39 to 41 weight percent styrene, from 4 to 6 weight percent hydroxy ethyl methacrylate, from 4 to 6 weight percent acrylic acid and from 4 to 6 weight percent methacrylic acid, crosslinked with zinc ion (about 0.9 equivalents).

In further embodiments, the polymer binder is a copolymer of a vinyl aromatic monomer such as styrene, o-methyl styrene, p-methyl styrene, or t-butylstyrene and a diene monomer, such as butadiene or isoprene. Preferred such binders are copolymers of styrene and butadiene. In some embodiments, the weight ratio of styrene to butadiene in the copolymer ranges from 70:30 to 30:70.

Methods for preparation of water insoluble polymer binders suitable for use in the composition of the invention are known in the art and not especially limited. The preparation method may be selected from solution, dispersion and emulsion polymerization processes. Emulsion polymerization is especially useful for preparing suitable polymer binders. The practice of emulsion polymerization is well known and discussed in detail in the literature, for example, in D. C. Blackley, Emulsion Polymerization (Wiley, 1975). The polymerization temperature is typically from ambient temperature up to 90° C. and may also involve use of dispersing agents, initiators, accelerators, emulsifiers, chain transfer agents. As will be readily understood by persons of ordinary skill, dispersing agents may include anionic or nonionic dispersing agents, polymerization initiators may be of the free radical type, such as ammonium or potassium persulfate. The initiators may be used alone or with an accelerator, such as potassium metabisulfite or sodium thiosulfate. Examples of suitable emulsifiers include, for example, alkaline metal and ammonium salts of alkyl, aryl, alkaryl and aralkyl sulfonates, sulfates, polyether sulfates, and alkoxylated derivatives of fatty acids, esters, alcohols, amines, amides and alkylphenols. Chain transfer agents, including mercaptans, polymercaptans and polyhalogen compounds may be used in the polymerization mixture to control molecular weight of the polymer.

In some embodiments, the polymer binder is present in the aqueous coating composition of the invention at a concentration of from 1 to 35 weight percent, preferably from 5 to 20 weight percent, based on the total weight of the aqueous composition (including optional ingredients as described below).

The aqueous coating compositions for use in the invention may contain additional optional ingredients such as, without limitation, one or more solvents, preservatives, wetting aids, leveling aids, wax emulsions, defoamers and viscosity modifiers, biocides, among other things.

In some embodiments, the aqueous coating compositions of the invention optionally contain a fluorescent dye as an optical brightener. Fluorescent dyes may be used to determine coating uniformity and coat weight. Such use is beneficial because it is a non-destructive technique that can give rapid readings of the coating quality without detracting from the appearance of the product.

It has surprisingly been discovered that in some embodiments, including the optical brighteners described herein in the coating compositions provides the added benefit of further suppressing dust from fine particles. Thus the brightener not only provides an easy way for determining the presence of a coating on the particle, but also in some embodiments further enhances dust suppression.

In some embodiments, optical brighteners for use in the invention are coumarin or coumarin derivatives of the following general structure:

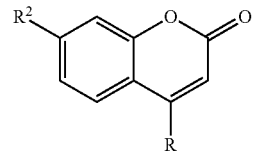

wherein R is H, C1-C12 alkyl, a C3-C12 cycloaliphatic group, a C1-C12 alkyl halide group, or a carboxy group; and $R^2$ is H, hydroxy (—OH), amine (—NH2), C1-C12 mono- or di-alkylamine, or a mono- or di-cycloaliphatic amine group.

Preferably, the coumarin or coumarin derivative are selected from the group consisting of coumarin, 7-diethylamino-4-methylcoumarin, 7-hydroxy-4-methylcoumarin, 7-amino-4-methylcoumarin, {7-(dimethylamino)-2,3-dihydrocyclopenta-[c][1]benzopyran-4(1H)-one}, {7-(dimethylamino)-4-(trifluoromethyl)coumarin) {, {2,3,6,7-tetrahydro-9-(trifluoromethyl)-1H,5H,11H-[1]benzopyrano[6,7,8-ij] qui nnolizin-11-one}, coumarin-3-carboxylic acid, 3-[2-(diethylamino)ethyl]-7-hydroxy-4-methylcoumarin, and dihydrocoumarin. A particularly preferred coumarin derivative useful in the present invention is 7-(diethylamino)-4-methylcoumarin, which may be represented by the following structure:

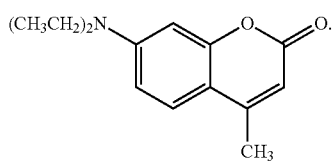

Other optical brighteners that may be used in the invention include, for instance, bis-stilbene compounds such as those described in U.S. Pat. No. 3,984,399, bis(benzoxazolyl) thiophene compounds such as those described in U.S. Pat. No. 3,135,762, and 4,4'-bis(2-benzoxazolyl)stilbene compounds such as described in BE 651310, each of which is hereby incorporated by reference herein.

More specific examples of suitable optical brighteners include, again without limitation, 2,2'-[(1,1'-biphenyl)-4,4'-diyldi-2,1-ethenediyl]-bis-benzenesulfonic acid disodium salt, 2,5-Bis(5-tert-butyl-benzoxazol-2-yl)thiophene, or 4,4'-Bis(2-benzoxazolyl)stilbene.

In some embodiments, it is preferred to dissolve or disperse the optical brightener in a solvent prior to addition to coating composition. Hydrophobic solvents are preferred. Examples of suitable solvents include, without limitation, 2,2,4-trimethyl-1,3-pentanediol mono(2-methylpropanoate), 1,2-Benzenedicarboxylic acid dibutyl ester, or hexyl cellosolve.

When used, the optical brightener is, in some embodiments, typically present in the aqueous coating composition of the invention at a concentration of from 0.001 to 5 weight percent, preferably from 0.05 to 0.2 weight percent, more preferably from 0.01 to 0.1 weight percent, based on the total weight of the aqueous composition.

The balance of the aqueous compositions, containing surfactant, water, polymer binder, optional poly(ethylene oxide), and any optional ingredients or co-solvents, is water. In some embodiments, the amount of water in the aqueous coating composition is 20 weight percent or less, alternatively 18 weight percent or less, or alternatively 16 weight percent or less, based on the total weight of the coating composition. In some embodiments, the amount of water in the aqueous coating composition is 5 weight percent or more, alternatively 10 weight percent or more, or alternatively 15 weight percent or more, based on the total weight of the coating composition.

The aqueous coating composition according to the invention may be coated on the proppant particle using techniques well known to those skilled in the art. By way of non-limiting example, the particle and the aqueous coating composition may be blended in a mixer with mechanical agitation. Or the aqueous coating composition may be sprayed onto a moving bed or falling stream of the particles. Or some combination of spraying the coating composition onto the particles followed by mixing with mechanical agitation may be used.

Particles may be heated or not. Some coating compositions may benefit from higher temperatures to induce some level of crosslinking. Other coating compositions merely benefit from the more rapid evaporation of the emulsifying water from the coating.

There is no particular limitation on how much coating should be applied to a particle. In some embodiments, it may be preferred that the total weight of the proppant comprise between about 100 ppm and about 10,000 ppm of the coating, on a dry basis. In a preferred embodiment, the amount of coating on the proppant, on a dry basis, is less than 10,000 ppm of particle weight, alternatively less than 5,000 ppm of particle weight, alternatively less than 2,000 ppm of particle weight, or alternatively less than 1,000 ppm of particle weight. In another preferred embodiment, the amount of coating on the particle, on a dry basis, is between 300 ppm and 700 ppm of particle weight.

As indicated above, proppant particles as described herein may exhibit significantly reduced dust generation, for instance during transloading and offloading of the proppant at a wellsite and/or at intermediate shipping transload points. It should be noted that to achieve this beneficial effect, it is not necessary that all particles within a batch (e.g., a truckload) be coated with the coating composition as described herein. Rather, in some embodiments, it may be desirable to only coat a fraction of the particles, for instance to reduce costs. By way of example, it may be desirable to coat 90 weight percent or less of the particles, alternatively 70 weight percent or less, or alternatively 50 weight percent or less. In some embodiments, it may be desirable for at least 20 weight percent, alternatively at least 30 weight percent, or alternatively at least 40% of the particles in a proppant batch to be coated. The coated particles, however should be blended in with the uncoated particles prior to transport and further handling that may induce dust to form.

In some embodiments useful in sub-freezing environments, an anti-freeze solvent may be partially substituted for water in the coating formulations. The impact of this substitution is to lower the freezing point of the emulsion sprayed onto the proppant particle and also to reduce the tendency of the proppant particles to freeze during transport in regions where the average daily temperature is significantly below 0° C. and the proppant has the chance to freeze together.

The antifreeze solvent may include ethylene glycol, diethylene glycol, triethylene glycol, propylene glycol, 1,2-butanediol, methanol, ethanol, propanol, butanol, pentanol, hexanol, heptanol, ethers containing 2 to 14 carbon atoms, or ketones containing 2 to 14 carbon atoms.

In some embodiments, the amount of antifreeze solvent used in the coating formulation may be up to 10 wt %, alternatively up to 20 wt %, alternatively up to 30 wt %, alternatively up to 40 wt %, alternatively up to 60 wt %, or alternatively up to 80 wt %, based on substitution of water.

Some embodiments of the invention will now be described in detail in the following Examples.

Examples

Polymer Preparation

Suitable polymer binders for use in the examples may be prepared, for instance, as shown in U.S. Pre-grant publication 2009/0155474, in U.S. Pat. No. 6,214,328, and/or they may be commercially available.

A typical procedure for making polymer is as follows. To a three liter, four-neck round bottom flask quipped with overhead stirrer, condenser, nitrogen adapter and a thermocouple is added 430 parts water, 10.9 parts of benzoic acid, and 19.2 parts of Rhodafac RS-610A (available from Rhodia). Separately, a stage-1 monomer emulsion is prepared by mixing 183 parts of water, 6.4 parts of Rhodafac RS-610A, 80 parts of butyl acrylate (BA), 200 parts of ethyl acrylate (EA), 60 parts of hydroxyethyl methacrylate (HEMA), 60 parts of methacrylic acid (MAA), and 4 parts of n-dodecyl mercaptan (n-DDM). With the nitrogen turned on, the reactor and contents at 85 C, 42 part of the above stage-1 monomer emulsion is charged with stirring, followed by an initiator solution of 1 part of sodium persulfate dissolved in 15 parts of water. The remaining monomer emulsion is then fed over 48 minutes, while maintaining a temperature of 85 C. A co-feed initiator solution containing 1 part of sodium persulfate and 73 parts of water is gradually added simultaneously with this monomer feed as well as stage 2 monomer feed as described later.

After stage-1 monomer is completely fed, stage-2 monomer is prepared by mixing 270 parts of water, 9.6 parts of Rhodafac RS-610A, 150 parts of butyl acrylate (BA), 282 parts of methyl methacrylate (MMA), 60 parts of hydroxyethyl methacrylate (HEMA), 108 parts of methacrylic acid (MAA), and 1.8 parts of n-dodecyl mercaptan (n-DDM). The stage-2 monomer emulsion is fed over 72 minutes, while maintaining a temperature of 85 C.

After the monomer emulsion and initiator feeds are complete, the reaction mixtures are "chased" with a ferrous sulfate, t-butyl hydroperoxide, ammonium persulfate, D-isoascorbic acid combination to reduce residual monomer levels. The reaction mixture is then cooled to room temperature and filtered. The emulsion polymer prepared has solids of 47%.

A typical procedure for prepare the aqueous coating compositions of the examples, containing the polymer binder, surfactant, water, and various optional ingredients, is as follows.

1. Charge deionized water to kettle. Heat to 60° C. 2. Stir water to establish and maintain a vortex throughout the process and add flocculant at a slow rate. Continue stirring for 60-120 minutes until the solution appears homogeneous. 3. Allow to cool to a temperature below the cloud point of the surfactant. 4. Add surfactant and agitate 10 minutes. 5. Add binder and agitate for 10 minutes. 6. Add optional ingredients together or sequentially with intermediate agitation between additions.

Example coating compositions (formulations) that may be prepared according to the protocols described above are shown in Tables 1-8.

TABLE 1

|  | Formulation | | |
| --- | --- | --- | --- |
|  | 1 | 2 | 3 |
| $C_8$—$C_{14}$O—($CH_2CH(CH_3)$—O)$_{2\text{-}5}$($CH_2CH_2O$)$_{5\text{-}9}$—H surfactant at 100% solids | 30 | 30 | 0 |
| $C_4H_9$—$CH(C_2H_5)$—$CH_2$—O—($CH_2CH(CH_3)$—O)$_{4\text{-}6}$—($CH_2CH_2O$)$_{5\text{-}7}$—H surfactant at 100% solids | 0 | 0 | 30 |
| Polymer binder emulsion derived from 69 to 71 weight percent of butyl acrylate; from 27 to 29 weight percent of styrene; and from 1 to 3 weight percent of acrylamide at 56% solids in water | 15 | 0 | 0 |
| Polymer binder emulsion derived from 69 to 71 weight percent of butyl acrylate; from 27 to 29 weight percent of styrene; from 0.25 to 0.75 weight percent hydroxyethylmethacrylate; and from 1-3 weight percent of acrylamide at 56% solids in water | 0 | 15 | 15 |
| Flocculant: HO—[—$CH_2CH_2O$—]$_n$—H, where n averages about 80,000 to 95,000 at 100% solids | 0.02 | 0.02 | 0.02 |
| Silicone Based Defoamer Foamaster MO 2111, supplied by BASF Corp at 100% solids. | 1.5 | 1.5 | 1.5 |
| Diluent: Water | 53.17 | 53.17 | 53.17 |
| Preservative: Kathon CG ICP, supplied by The Dow Chemical Company at 1.5% solids in water | 0.31 | 0.31 | 0.31 |
| Total | 100.00 | 100.00 | 100.00 |

TABLE 2

|  | Formulation | | | | | |
| --- | --- | --- | --- | --- | --- | --- |
|  | 4 | 5 | 6 | 7 | 8 | 9 |
| $C_8$—$C_{14}$O—($CH_2CH(CH_3)$—O)$_{2\text{-}5}$($CH_2CH_2O$)$_{5\text{-}9}$—H surfactant at 100% solids | 30 | 30 | 30 | 30 | 0 | 30 |
| $C_4H_9$—$CH(C_2H_5)$—$CH_2$—O—($CH_2CH(CH_3)$—O)$_{4\text{-}6}$—($CH_2CH_2O$)$_{5\text{-}7}$—H surfactant at 100% solids | 0 | 0 | 0 | 0 | 30 | 0 |
| Polymer binder emulsion derived from 69 to 71 weight percent of butyl acrylate; from 26 to 28 weight percent of styrene; from 0.25 to 0.75 weight percent hydroxyethylmethacrylate; and from 1-3 weight percent of acrylamide at 56% solids in water | 15 | 15 | 15 | 15 | 15 | 15 |
| Flocculant: HO—[—$CH_2CH_2O$—]$_n$—H, where n averages about 80,000 to 95,000 at 100% solids | 0.02 | 0.02 | 0.02 | 0.02 | 0.02 | 0.02 |
| Silicone based Defoamer: Foamaster MO 2111, supplied by BASF Corp. at 100% solids | 1.5 | 1.5 | 1.5 | 3.0 | 1.5 | 1.5 |
| Premix Optical Brightener Package Add with stirring |  |  |  |  |  |  |
| Solvent: 2,2,4-trimethyl-1,3-pentanediol mono(2-methylpropanoate) | 0.8 | 0.8 | 0.8 | 0.8 | 0.8 | 0.8 |

TABLE 2-continued

|  | Formulation | | | | | |
| --- | --- | --- | --- | --- | --- | --- |
|  | 4 | 5 | 6 | 7 | 8 | 9 |
| Optical Brightener: 7-diethylamino-4-methyl coumarin at 100% solids | 0.084 | 0.0008 | 0.042 | 0.042 | 0.017 | 0.017 |
| Add |  |  |  |  |  |  |
| Diluent: Water | 53.17 | 53.17 | 53.17 | 51.6 | 53.17 | 53.17 |
| Preservative: Kathon CG ICP, supplied by the Dow Chemical Company at 1.5% solids in water | 0.31 | 0.31 | 0.31 | 0.31 | 0.31 | 0.31 |
| Total | 100.88 | 100.80 | 100.84 | 100.77 | 100.82 | 100.82 |

TABLE 3

|  | Formulation | | | |
| --- | --- | --- | --- | --- |
|  | 10 | 11 | 12 | 13 |
| $C_8$—$C_{14}$O—$(CH_2CH(CH_3)$—$O)_{2-5}(CH_2CH_2O)_{5-9}$—H surfactant at 100% solids | 30 | 30 | 30 | 30 |
| $C_4H_9$—$CH(C_2H_5)$—$CH_2$—O—$(CH_2CH(CH_3)$—$O)_{4-6}$—$(CH_2CH_2O)_{5-7}$—H surfactant at 100% solids | 0 | 0 | 0 | 0 |
| Polymer binder emulsion derived from 69 to 71 weight percent of butyl acrylate; from 27 to 29 weight percent of styrene; from 0.25 to 0.75 weight percent hydroxyethylmethacrylate; and from 1-3 weight percent of acrylamide at 56% solids in water | 15 | 15 | 15 | 15 |
| Flocculant: HO—[—$CH_2CH_2O$—]$_n$—H, where n averages about 80,000 to 95,000 at 100% solids | 0.02 | 0.02 | 0.02 | 0.02 |
| Silicone Defoamer: Foamaster MO 2111, supplied by BASF Corp. at 100% solids | 1.5 | 1.5 | 3.0 | 1.5 |
| Premix |  |  |  |  |
| Optical Brightener Package |  |  |  |  |
| Add with stirring |  |  |  |  |
| Solvent: 2,2,4-trimethyl-1,3-pentanediol diisobutyrate | 0.8 |  |  |  |
| Solvent: 1,2-Benzenedicarboxylic acid dibutyl ester |  | 0.8 |  | 0.8 |
| Solvent: 2,2,4-trimethyl-1,3-pentanediol mono(2-methylpropanoate) |  |  | 0.8 |  |
| Optical Brightener: 7-diethylamino-4-methyl coumarin at 100% solids | 0.084 | 0.008 | 0.042 | 0.042 |
| Add |  |  |  |  |
| Diluent: Water | 53.17 | 53.17 | 53.17 | 51.6 |
| Preservative: Kathon CG ICP, supplied by the Dow Chemical Company at 1.5% solids in water | 0.31 | 0.31 | 0.31 | 0.31 |
| Total | 100.88 | 100.81 | 102.34 | 99.27 |

TABLE 4

|  | Formulation | | | | | | |
| --- | --- | --- | --- | --- | --- | --- | --- |
|  | 14 | 15 | 16 | 17 | 18 | 19 | 20 |
| $C_8$—$C_{14}$O—$(CH_2CH(CH_3)$—$O)_{2-5}(CH_2CH_2O)_{5-9}$—H surfactant at 100% solids | 0 | 0 | 0 | 0 | 0 | 30 | 30 |
| $C_4H_9$—$CH(C_2H_5)$—$CH_2$—O—$(CH_2CH(CH_3)$—$O)_{4-6}$—$(CH_2CH_2O)_{5-7}$—H surfactant at 100% solids | 30 | 30 | 30 | 30 | 30 | 0 | 0 |
| Polymer Binder emulsion derived from 2 stages. Stage 1 19-21 weight percent butyl acrylate; 49-51 weight percent ethyl acrylate; 14-16 weight percent hydroxyethyl methacrylate and 14-16 weight percent methacrylic acid. Stage 2 24-26 weight percent butyl acrylate; 46-48 weight percent methyl methacrylate; 9-11 weight percent hydroxyethyl methacrylate and 17-19 weight percent methacrylic acid. At 46% solids in water. | 15 |  |  |  |  |  |  |
| Polymer binder emulsion derived from 27 to 29 weight percent of butyl acrylate; from 61 to 63 weight percent of methyl methacrylate; and from 9 to 11 weight percent of methacrylic acid, |  | 15 |  |  |  |  |  |

TABLE 4-continued

|  | Formulation | | | | | | |
| --- | --- | --- | --- | --- | --- | --- | --- |
|  | 14 | 15 | 16 | 17 | 18 | 19 | 20 |
| crosslinked with zinc ion (about 0.5 equivalents). At 38% solids in water. | | | | | | | |
| Polymer Binder emulsion derived from 59-61 weight percent Styrene 39-41 weight percent butadiene. At 48% solids in water. | | | | | 15 | | |
| Polymer binder emulsion derived from 39 to 41 weight percent of styrene; from 29 to 31 weight percent of butyl acrylate; from 15 to 17 weight percent of methyl methacrylate; from 4 to 6 weight percent Hydroxyethyl methacrylate; from 4 to 6 weight percent acrylic acid; and from 4 to 6 weight percent of methacrylic acid, crosslinked with zinc ion (about 0.9 equivalents). At 38% solids in water. | | | | | | 15 | 15 |
| Polymer binder emulsion derived from 69 to 71 weight percent of butyl acrylate; from 27 to 29 weight percent of styrene; from 0.25 to 0.75 weight percent hydroxyethylmethacrylate; and from 1-3 weight percent of acrylamide at 56% solids in water | | | 15 | 15 | | | |
| Flocculant: HO—[—$CH_2CH_2O$—]$_n$—H, where n averages about 80,000 to 95,000 at 100% solids | 0.02 | 0.02 | 0.02 | 0.02 | 0.02 | 0.02 | 0.02 |
| Silicone Defoamer: Foamaster MO 2111, supplied by BASF Corp. at 100% solids | 3 | 3 | 3 | 3 | 3 | 3 | 3 |
| Premix | | | | | | | |
| Optical Brightener Package | | | | | | | |
| Add with stirring | | | | | | | |
| Solvent: 2,2,4-trimethyl-1,3-pentanediol mono(2-methylpropanoate) | 0.8 | 0.8 | 0.8 | 0.8 | 0.8 | 0.8 | 0.8 |
| Optical Brightener: 7-diethylamino-4-methyl coumarin at 100% solids | 0.042 | 0.042 | | | 0.042 | 0.042 | 0 |
| Optical Brightener 2,2'-[(1,1'-BIPHENYL)-4,4'-DIYLDI-2,1-ETHENEDIYL]-BIS-BENZENESULFONIC ACID DISODIUM SALT | | | 0.042 | | | | |
| Optical Brightener 2,5-Bis(5-tert-butyl-benzoxazol-2-yl)thiophene | | | | 0.042 | | | |
| Add | | | | | | | |
| Diluent: Water | 51.17 | 51.17 | 51.17 | 51.17 | 51.17 | 51.17 | 51.17 |
| Preservative: Kathon CG ICP, supplied by the Dow Chemical Company at 1.5% solids in water | 0.31 | 0.31 | 0.31 | 0.31 | 0.31 | 0.31 | 0.31 |
| Total | 100.34 | 100.34 | 100.34 | 100.34 | 100.34 | 100.34 | 100.30 |

TABLE 5

|  | Formulation | | |
| --- | --- | --- | --- |
|  | 21 | 22 | 23 |
| $CH_3(CH_2)_{10}CH_2(OCH_2CH_2)_{2-4}OSO_3Na$. surfactant at 30% solids | 30 | 0 | 0 |
| $NaSO_3$—$C6H_5$—O—$C_6H_4(C_{12}H_{26})SO_3Na$ surfactant at 45% solids | 0 | 30 | 0 |
| $[C_5H_5O(OH)_4]_{1-3}$—O—$C_8H_{17}$—$C_{14}H_{29}$ surfactant at 51% solids | | | 30 |
| Polymer binder emulsion derived from 69 to 71 weight percent of butyl acrylate; from 27 to 29 weight percent of styrene; and from 1 to 3 weight percent of acrylamide at 56% solids in water | 15 | 0 | 0 |
| Polymer binder emulsion derived from 69 to 71 weight percent of butyl acrylate; from 27 to 29 weight percent of styrene; from 0.25 to 0.75 weight percent hydroxyethylmethacrylate; and from 1-3 weight percent of acrylamide at 56% solids in water | 0 | 15 | 15 |
| Flocculant: HO—[—$CH_2CH_2O$—]$_n$—H, where n averages about 80,000 to 95,000 at 100% solids | 0.02 | 0.02 | 0.02 |
| Silicone Based Defoamer Foamaster MO 2111, supplied by BASF Corp at 100% solids. | 1.5 | 1.5 | 1.5 |
| Diluent: Water | 53.17 | 53.17 | 53.17 |
| Preservative: Kathon CG ICP, supplied by The Dow Chemical Company at 1.5% solids in water | 0.31 | 0.31 | 0.31 |
| Total (grams) | 100.00 | 100.00 | 100.00 |

TABLE 6

| | Formulation | |
|---|---|---|
| | 24 | 25 |
| $C_8$—$C_{14}$O—($CH_2CH(CH_3)$—O)$_{2-5}$($CH_2CH_2O$)$_{5-9}$—H surfactant at 100% solids | 4 | 0 |
| Polymer binder emulsion derived from 69 to 71 weight percent of butyl acrylate; from 27 to 29 weight percent of styrene; from 0.25 to 0.75 weight percent hydroxyethylmethacrylate; and from 1-3 weight percent of acrylamide at 56% solids in water | 0 | 7.14 |
| Diluent: Water | 16 | 12.86 |
| Total (grams) | 20 | 20 |

TABLE 7

| | Formulation | | | |
|---|---|---|---|---|
| | 26 | 27 | 28 | 29 |
| Polymer binder emulsion derived from 69 to 71 weight percent of butyl acrylate; from 27 to 29 weight percent of styrene; from 0.25 to 0.75 weight percent hydroxyethylmethacrylate; and from 1-3 weight percent of acrylamide at 56% solids in water | 15 | 15 | 15 | 15 |
| $C_8$—$C_{14}$O—($CH_2CH(CH_3)$—O)$_{2-5}$($CH_2CH_2O$)$_{5-9}$—H surfactant at 100% solids | 0 | 0 | 0 | 0 |
| $CH_3(CH_2)_{14}CH_2$—N—$(CH_3)_3$Cl surfactant at 25% solids | 60 | 0 | 0 | 0 |
| $CH_3(CH_2)_{10}CH_2(OCH_2CH_2)_{2-4}$ OSO$_3$Na. surfactant at 30% solids | 0 | 50 | 0 | 0 |
| NaSO$_3$—$C_6H_5$—O—$C_6H_4(C_{12}H_{26})$SO$_3$Na surfactant at 45% solids | 0 | 0 | 50 | 0 |
| $[C_5H_5O(OH)_4]_{1-3}$—O—$C_8H_{17}$—$C_{14}H_{29}$ Surfactant at 51% solids | 0 | 0 | 0 | 29.41 |
| Silicone Based Defoamer Foamaster MO 2111, supplied by BASF Corp at 100% solids. | 1.5 | 1.5 | 1.5 | 1.5 |
| Water | 23.5 | 33.5 | 33.5 | 54.09 |
| Total (grams) | 100.0 | 100.0 | 100.0 | 100.0 |

TABLE 8

| | Formulation | |
|---|---|---|
| | 30 | 31 |
| Polymer binder emulsion derived from 69 to 71 weight percent of butyl acrylate; from 27 to 29 weight percent of styrene; from 0.25 to 0.75 weight percent hydroxyethylmethacrylate; and from 1-3 weight percent of acrylamide at 56% solids in water | 15 | 15 |
| $C_3H_7CHO(C_2H_4O)_{4-6}C_2H_4(CH_2)_{4-6}CH_3$ surfactant at 100% solids | 15 | 0 |
| $C_4H_9$—CH($C_2H_5$)—$CH_2$—O—($CH_2CH(CH_3)$—O)$_{4-6}$—($CH_2CH_2O$)$_{8-10}$—H surfactant at 100% solids | 15 | 0 |
| $C_3H_7CHO(C_2H_4O)_{6-8}C_2H_4(CH_2)_{4-6}CH_3$ surfactant at 100% solids | 0 | 15 |
| $C_4H_9$—CH($C_2H_5$)—$CH_2$—O—($CH_2CH(CH_3)$—O)$_{4-6}$—($CH_2CH_2O$)$_{5-7}$—H surfactant at 100% solids | 0 | 15 |
| Premix Optical Brightener Package | | |
| Optical Brightener: 7-diethylamino-4-methyl coumarin at 100% solids | 0.042 | 0.042 |
| Solvent: 2,2,4-trimethyl-1,3-pentanediol mono(2-methylpropanoate) | 0.8 | 0.8 |
| Add | | |
| Silicone Based Defoamer Foamaster MO 2111, supplied by BASF Corp at 100% solids. | 1.5 | 1.5 |
| Solvent: propylene glycol | 5 | 31.33 |
| Water | 47.66 | 21.33 |
| Total (grams) | 100.00 | 100.00 |

Various of the aqueous compositions shown in the above Tables are applied to sand particles and their properties evaluation under different test conditions. Comparisons are made to untreated sand particles (comparative examples).

Procedure for Analyzing Particle Size: LS 13 320 Laser Diffraction Particle Size Analyzer The Beckman Coulter LS 13 320 will measure the size distribution of particles suspended either in a liquid or in dry powder form by using the principles of light scattering. This instrument is composed of the LS 13 320 optical bench and an Aqueous Liquid Module (ALM). This instrument utilizes PIDS (Polarization Intensity Differential Scattering) enabling a dynamic measurement range of 0.04 to 2000 micron. The method involves the analysis (deconvolution) of the patterns of scattered light produced when particles of different sizes are exposed to a beam of light. The LS 13 320 series of instruments takes advantage of these principle to rapidly provide precise and reproducible particle size distributions.

The Tornado Dry Powder System is intended for use with the LS 13 320 Optical Bench. It is capable of feeding and measuring dry powder samples in the size range 0.4 µm to 2000 µm. The Tornado DPS measures the entire sample presented to the instrument, with a sample volume that allows an analysis that will provide statistically accurate results. The range of sample volumes the instrument can accept should provide for a minimum 10 second run at controlled obscuration. The sample is placed in a sample holder and delivered to the sensing zone in the optical bench by a vacuum. The Tornado DPS provides automatic feed rate (obscuration) control. The set point for the obscuration is user selectable between 4% and 8%. The accuracy of the average obscuration control is better than ±2% from the set point.

The system disperses cohesive powders without milling fragile materials. The dispersion of the dry powders is comparable to the dispersion achieved when the samples are run wet with proper manual pre-dispersion. The sample to be measured is contained in the system to prevent airborne contamination of the work area throughout. This is accomplished by maintaining a negative pressure (vacuum) system for the sample path and trapping the sample via a filtration system in the vacuum.

In an exemplary procedure, proppant Sand (20/40 mesh) is ground in a Osterizer 14 speed Blender set at "Liquefy" (highest setting) for 2 minutes to produce fines, alternatively the Proppant sand (20/40 mesh) is placed in a ceramic jar with ceramic one inch diameter balls and placed on a roller mill overnight to produce fines to mimic fines or dust that are produced during pneumatic conveyance of the sand during transloading operations at a proppant transportation site.

Preweighed sand is placed into a stack of U.S. Standard Sieve Series with Lid and pan. Screen Mesh series No. 20, 40, 100, corresponding to 840, 420 and 150 microns. Sieve set placed on Sieve shaker for 15 minutes to separate the sand sizes. From each sieve, the resulting sand is re-weighed and the fractions collected separately. Depending on the particle size range of interest, sand as contained can range from 150-840 microns or larger, sieved sand can be distinct ranges. The sand is preweighed into jars, starting at 65 grams. To obtain a reading on the untreated sand, 5 grams is removed and the particle size distribution and volume fraction is determined using the Beckman LS 13 320 Tornando attachment. For the remaining 60 grams of sand, 0.15 grams of formulation is sprayed or dispensed onto the sand, with resulting treatment of 0.05%. A Sequest Perfect Euromist Optima (160 microliter) 0.014"×0.010" deep, 0.060' tubing internal diameter pump valve from Aptar Group, II, USA is used as the spray device. The spray device is fitted to a 60 ml plastic polyethylene container designed to accommodate the device. Formulations to be tested are charged to the 60 ml container to dispense by the sprayer onto the sand. If other rates of application are required, the amount of formulation is adjusted to achieve the desired amount deposited to the sand. Additionally, the solids of the formulation are taken into account to deposit the targeted amount of coating to the sand. Formulations are applied based on a solids basis. The jar is capped and the sand with the formulation is vigorously shaken or for 2 minutes. Aliquots of the formula treated sand are tested on the Beckman LS 13320 Tornado, with up to 10 replicates.

Particle Size Range from 150 to 420 Microns (Formulation 6 vs Untreated)

Sand supplied at 20/40 mesh (840 to 420 microns) was stressed or fractured in the roller mill or blender to produce fines or dust particles to mimic the dust produced during proppant conveyance. The range in sieves 100/40 produces a micron range of 150 to 420 used in this study.

A common approach to define the distribution width from the Beckman Coulter Particle size analyzer is to cite five values on the x-axis; the D<10%, D<25%, D<50%, D<75% and D<90% as depicted in the tables below. The D,50%, known as the median, has been defined as the diameter where half the population of particles lies below this value. Similarly, D<90% defines the distribution that lies below this diameter and D<10% is indicative of 10% of the population below that diameter. Data comparing sand coated with inventive formulation 6 versus untreated sand (comparative) is in Table 9.

TABLE 9

| Formulation/Treatment | Microns | | | | |
|---|---|---|---|---|---|
| | <10% | <25% | <50% | <75% | <90% |
| 6 | 292 | 360 | 3663 | 457 | 533 |
| No Treatment | 192 | 246 | 338 | 440 | 523 |

Particle Size shift. Data shows treatment with formulation 6 shifts the particle size distribution to higher particle sizes. This corresponds to less dust or finer particles present in field operations where proppants are being handled.

Particle Size Range from 150-420 Microns Particle (Formulation 2 vs Untreated)

Sand supplied at 20/40 mesh (840 to 420 microns) was stressed or fractured in the roller mill or blender to produce fines or dust particles to mimic the dust produced during proppant conveyance. The range in sieves 100/40 produces a micron range of 150 to 420 used in this study. Data comparing sand coated with inventive formulation 2 versus untreated sand (comparative) is in Table 10.

TABLE 10

| Formulation/Treatment | Microns | | | | |
|---|---|---|---|---|---|
| | <10% | <25% | <50% | <75% | <90% |
| 2 | 212 | 279 | 377 | 468 | 530 |
| No Treatment | 202 | 261 | 357 | 453 | 533 |

Particle Size shift. Data show treatment with formulation 2 shifting the particle size distribution to higher sizes. This corresponds to less dust or finer particles present in field operations where proppants are being handled.

500 ppm of coating on sand (sprayed) 20/40 sand. Particle size range 150 microns to 850 microns (formulations 1, 2, and 3 vs untreated)

Data comparing sand coated with inventive formulations versus untreated sand (comparative) is in Table 11.

TABLE 11

| Sample | Microns | | | | |
|---|---|---|---|---|---|
| | <10% | <25% | <50% | <75% | <90% |
| Untreated | 493 | 594 | 696 | 803 | 903 |
| 1 | 514 | 606 | 705 | 805 | 906 |
| 2 | 502 | 597 | 697 | 804 | 905 |
| 3 | 529 | 613 | 713 | 824 | 927 |

Particle Size shift. Data show treatment shifting the particle size distribution to higher sizes. This corresponds to less dust or finer particles present in field operations where proppants are being handled.

500 ppm of coating on sand (sprayed) 20/40 sand. Particle size range 150 microns to 850 microns (formulations 1, 2, 4, and 5 vs untreated)

Data comparing sand coated with inventive formulations versus untreated sand (comparative) is in Table 12.

TABLE 12

| | Microns | | | | |
|---|---|---|---|---|---|
| Sample | <10% | <25% | <50% | <75% | <90% |
| Untreated | 514 | 609 | 710 | 813 | 913 |
| 1 | 528 | 622 | 735 | 883 | 1026 |
| 2 | 458 | 571 | 718 | 917 | 1092 |
| 4 | 535 | 626 | 727 | 834 | 938 |
| 5 | 551 | 634 | 734 | 844 | 954 |

Data in the table shows treatments providing larger particles, hence suppressing the finer particles being generated during the grinding of the sand.

500 ppm of coating on sand (sprayed) 20/40 sand. Particle size range 150 microns to 850 microns (formulations 2, 7, 14, 15, 16, 18, 19, and 20 vs untreated)

Data comparing sand coated with inventive formulations versus untreated sand (comparative) is in Table 13 and 14.

TABLE 13

| Sample | <10% (μm) | <25% (μm) | <50% (μm) | <75% (μm) | <90% (μm) |
|---|---|---|---|---|---|
| Untreated | 481.3 | 559.8 | 664.4 | 812.0 | 982.7 |
| 2 | 379.0 | 554.9 | 958.4 | 1354.1 | 1490.2 |
| Untreated | 457.0 | 552.2 | 654.7 | 779.2 | 901.5 |
| 7 | 494.6 | 579.9 | 681.0 | 786.4 | 1048.3 |
| Untreated | 545.7 | 620.3 | 724.4 | 845.1 | 950.9 |
| 14 | 520.8 | 631.2 | 727.8 | 824.6 | 1107.3 |
| Untreated | 523.7 | 596.5 | 696.7 | 812.4 | 920.4 |
| 15 | 518.3 | 612.8 | 709.0 | 801.3 | 984.5 |

TABLE 14

| Sample | <10% (μm) | <25% (μm) | <50% (μm) | <75% (μm) | <90% (μm) |
|---|---|---|---|---|---|
| Untreated | 496.0 | 533.4 | 675.9 | 870.4 | 1185.0 |
| Formulation #2 | 504.0 | 582.5 | 709.5 | 989.6 | 1679.0 |
| Untreated | 515.7 | 581.4 | 711.6 | 899.2 | 1176.0 |
| Formulation #7 | 520.0 | 570.1 | 719.8 | 803.7 | 1640.7 |
| Untreated | 541.8 | 593.5 | 690.6 | 801.2 | 902.8 |
| Formulation #16 | 515.2 | 571.3 | 682.6 | 768.2 | 1112.8 |
| Untreated | 465.9 | 545.5 | 647.5 | 816.0 | 990.5 |
| Formulation #18 | 516.9 | 573.3 | 667.6 | 757.8 | 927.7 |
| Untreated | 510.1 | 578.9 | 706.5 | 873.6 | 1047.0 |
| Formulation #19 | 469.8 | 581.6 | 773.9 | 883.5 | 1182.9 |
| Untreated | 477.7 | 544.2 | 640.0 | 794.1 | 1006.0 |
| Formulation #20 | 535.8 | 589.1 | 688.8 | 791.0 | 887.2 |

Particle Size shift. Data show treatment shifting the particle size distribution to higher sizes. This corresponds to less dust or finer particles present in field operations where proppants are being handled.

An alternative approach to analyzing the particle size suppression is to calculate the area under the curve and compare untreated sand to sand treated with the formulations. A reduction of area under the curve corresponds to a recution in fines or dust during the proppant conveyance. Such data is shown in FIG. 1.

500 ppm of coating on sand (sprayed) 20/40 sand. Particle size range less than 150 microns.

For this study, Sand originally supplied at 20/40 mesh (840/420 microns) was stressed to produce a particle size range less than 150 microns to mimic the fines or dust generated during proppant conveyance. Data are shown in Table 15.

TABLE 15

| Formulation | Area Under the Curve | % Reduction in Area vs Untreated |
|---|---|---|
| 2 | 590.1 | 5.3 |
| 13 | 425.3 | 31.7 |
| 7 | 92.3 | 85.2 |
| 11 | 173 | 72.2 |
| 10 | 117.7 | 81.1 |

Dust Suppression Showing Different Coating Compositions of this Invention

Sand supplied at 20/40 mesh (840 to 420 microns) was stressed or fractured in the roller mill or blender to produce fines or dust particles to mimic the dust produced during proppant conveyance. The range in sieves 100/40 produces a micron range of 150 to 850 used in this study. Formulations were applied by spray application to obtain the desired coating amount. Data is shown in Table 16.

TABLE 16

| | Sample | | | |
|---|---|---|---|---|
| | untreated | Formulation 21 | Formulation 22 | Formulation 23 |
| Coating Application rate | No Application | 500 parts per million | 500 parts per million | 500 parts per million |
| Area | 6882 | 6598 | 6632 | 6771 |

Application rate designates the amount of material applied to coating on a solids basis Demonstrates that Individual Components not as Effective as Combination.

In the following examples, the Beckman Coulter LS 13 320 fitted with the Tornado Dry Powder System was used to determine particle characteristics of sand coated with the formulations. The total area of the particle distribution (0-2000 microns) measured by the Beckman Coulter LS 1320 fitted with the Tornado Dry Powder System was determined by output from the device. The area represents an integrated measurement of a measurable effect or phenomenon of the volume percent of particles at the different particle sizes determined during the measurement. It is used as a cumulative measurement of particle size distribution. An overall reduction in the measurement (area), in this case particle size under a defined range of sizes is associated with an overall reduction of the particles or dust.

Sand supplied at 20/40 mesh (840 to 420 microns) was stressed or fractured in the roller mill or blender to produce fines or dust particles to mimic the dust produced during proppant conveyance. The range in sieves 100/40 produces a micron range of 150 to 850 used in this study. Formulations were applied by spray application to obtain the desired coating amount.

TABLE 17

| | Sample | | |
|---|---|---|---|
| | Formulation 2 | Formulation 24 | Formulation 25 |
| Amount (parts per million) | 500 | 500 | 500 |
| Area | 6162 | 6802 | 6759 |

The lower area value of Formulation 2 compared to Formulation 24 and Formulation 25 show less particles being generated in the Tornado Dry Powder System. The higher area values for Formulation 24 (surfactant only) formulation and Formulation 25 (polymer only) formulation indicate more dust particles being generated in the Tornado Dry Powder System. The data shows that the combination of the surfactant and the polymer demonstrates the dust suppression of proppant dust of the invention better than the individual components, separately.

Turbidity Readings

Yet another approach to analyzing the particle suppression provided by the compositions of the invention is to determine the suspension of particles in water extractions from coated and uncoated sand by measuring the turbidity of the water extractions. Turbidity is measured by an instrument called a nephelometer. The units of turbidity from a nephelometer are Nephelometric Turbidity Units (NTU). High NTU values indicate higher turbidity and lower NTU values indicate lower turbidity. Turbidity in the water extractions of the coated and uncoated sand is due to particles suspended in the water. Low NTU values of the coated sand indicate that less particles are extracted from the coated sand demonstrating particle dust suppression. The uncoated sand has the highest NTU value indicating more particles being extracted from the sand.

Sand Turbidity Method

Sample Preparation:

Sand coating information should be obtained from sand source or recorded during preparation including sand sieve size and experimental ppm coating level (calculated using weight of formulation added to sand, sand weight, and formulation solids content). At higher sand coating levels, a pronounced effect of formulation leaving the sand and dissolving into the water will affect readings as the test solution can become an opaque white. For the current invention, small aliquots of sand (~20 g each) are placed in a weighing tin. The sand is spread across the weighing tin and dried at 80 degrees Celsius overnight to dry and adhere the coating to the sand to avoid this noise.

Oakton T-100 Turbidity Meter (Nephelometer)-Instrument Calibration:

The Oakton T-100 Turbidity meter should be powered up and calibrated shortly prior to use. By pressing the CAL button, the standards can be entered in descending turbidity. Wait for the instrument to display the current standard to be read, ensure the outside of the test vial is clean with a kimwipe, place the vial in the holder with the arrows on vial and reader aligned, and press enter. The order of reading should be: 800 (NTUs), 100, 20, and 0.02. Before reading test samples it is suggested that the standard closest to the expected turbidity values for the samples be read to check the accuracy of the calibration.

Testing Samples:

Weigh 3 grams±0.03 g on analytical balance and record weight. Use micropipette to add 15 mL of DI water to vial. Agitate sample using a Vortex mixer for 5 seconds (start time from when sample reaches mixing velocity, the samples take a moment to speed up). Immediately remove 10 mL from the top of the vial using the micropipette and taking care not to draw up sand into the clean pipette tip. Dispense into turbidity read vial. Immediately prior to reading, invert vial gently 3 times, place vial in holder and align the arrows, set timer for 60 seconds and read at end of time period. Repeat for additional samples using clean vials and pipette tips. A background sample test of deionized water is suggested to ensure any detectable level of turbidity from the water itself or minute amounts from cleaning the vial are noted and subtracted from the test samples.

Demonstrates Range of Coating Weights Applied to Sand.

For this study, Sand having a 40/70 mesh (420/210 microns) was used as supplied and treated with Formulation 2 composition of this invention to determine fines or dust suppression that would be indicative during proppant conveyance. The coatings were applied by spray application as previously described and adjusting for the amount of coating to be applied to obtain the desired rate of coating application on a solids basis as provided in Table 18.

TABLE 18

| | Coating Amount (parts per million) | | | | | |
|---|---|---|---|---|---|---|
| | 0 | 125 | 250 | 500 | 1000 | 2000 |
| NTU | 22.1 | 8.03 | 4.61 | 4.11 | 3.43 | 2.41 |

Note:
NTU represents average of three determinations

For the following study, Sand having a 40/70 mesh (420/210 microns) was used as supplied and treated with the compositions of this invention to determine fines or dust suppression that would be indicative during proppant conveyance. The coatings were applied by spray application as previously described with a 500 ppm amount of coating being applied to on a solids basis. Data are shown in Table 19 and demonstrate lower turbidity values for the compositions of the invention, corresponding to reduced dust.

TABLE 19

| | Sample | | | | |
|---|---|---|---|---|---|
| | un-coated | Formulation 26 | Formulation 27 | Formulation 28 | Formulation 29 |
| NTU value | 24.13 | 2.77 | 5.36 | 5.96 | 3.96 |

Dust Suppression Using Surfactant Blends

Sand supplied at 20/40 mesh (840 to 420 microns) was stressed or fractured in the roller mill or blender to produce fines or dust particles to mimic the dust produced during proppant conveyance. The range in sieves 100/40 produces a micron range of 150 to 850 used in this study. 500 parts per million of coating on a solids basis was applied to the sand and the area of the particle distribution was measured. The Beckman Coulter LS 13 320 fitted with the Tornado Dry Powder System was used to measure the particle distribution in the 0-2000 micron range and obtain the area measurements. Data are shown in Table 20. Table 20.

TABLE 20

| | Sample | | |
|---|---|---|---|
| | Untreated | Formulation 30 | Formulation 31 |
| Area | 7269.55 | 6618.02 | 6778.66 |

The untreated sand showed more dust as measured by the larger area determined from the instrument. The treated sand with coatings of this invention, Formulation 32 and Formulation 33, showed lower area indicating less dust. The instrument detects less dust in the Tornado Chamber and this is reflected in a lower area being measured for the particle distribution detected by the instrument.

What is claimed is:

1. A proppant for use in hydraulic fracturing, the proppant comprising:
   a particle; and
   a coating disposed on the particle that is formed from an aqueous coating composition, the aqueous coating composition including, based on the total weight of the aqueous coating composition, from 10 to 65 weight percent of a surfactant, from 1 to 35 weight percent of a polymer binder that is a water insoluble emulsion polymer, and balance water,
   wherein the polymer binder comprises an aqueous dispersion of particles made from a copolymer comprising one of:
   (A)(i) from 80 to 99.9 weight percent of at least one first ethylenically unsaturated monomer not including component (A)(ii), and (A)(ii) from 0.1 to 20 weight percent of a carboxylic acid monomer, based on the weight of the copolymer, or
   (B)(i) from 75 to 99 weight percent of at least one second ethylenically unsaturated monomer not including component (B)(ii), and (B)(ii) from 1 to 25 weight percent of an ethylenically unsaturated carboxylic acid monomer stabilized with a polyvalent metal, based on the weight of the copolymer.

2. The proppant of claim 1, wherein the at least one first ethylenically unsaturated monomer or second ethylenically unsaturated monomer is (meth)acrylic acid.

3. The proppant of claim 1, wherein the polyvalent metal is zinc or calcium.

4. The proppant of claim 1, wherein the surfactant is an alkoxylate.

5. The proppant of claim 1, wherein the coating further comprises an optical brightener.

6. The proppant of claim 1, wherein the coating further comprises an anti-freeze solvent.

7. The proppant of claim 1, wherein the coating covers less than 50 percent of the particle.

8. A process of manufacturing the proppant of claim 1, comprising providing the particle and forming the coating on the particle.

* * * * *